US011251655B2

(12) United States Patent
Cho et al.

(10) Patent No.: US 11,251,655 B2
(45) Date of Patent: Feb. 15, 2022

(54) ELECTRONIC DEVICE AND METHOD FOR CONTROLLING WIRELESS CHARGING

(71) Applicant: Samsung Electronics Co., Ltd., Suwon-si (KR)

(72) Inventors: Sungjoon Cho, Suwon-si (KR); Jungmin Lee, Suwon-si (KR); Hansol Choi, Suwon-si (KR); Youngmi Ha, Suwon-si (KR); Yusu Kim, Suwon-si (KR); Kyungmin Park, Suwon-si (KR); Juhyang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 16/698,741

(22) Filed: Nov. 27, 2019

(65) Prior Publication Data

US 2020/0266650 A1 Aug. 20, 2020

(30) Foreign Application Priority Data

Feb. 19, 2019 (KR) ........................ 10-2019-0019288

(51) Int. Cl.
*H02J 50/10* (2016.01)
*H02J 7/02* (2016.01)
(Continued)

(52) U.S. Cl.
CPC ............... *H02J 50/10* (2016.02); *H02J 7/02* (2013.01); *H02J 50/80* (2016.02); *H02J 7/0029* (2013.01)

(58) Field of Classification Search
CPC ..................................................... H02J 50/80
(Continued)

(56) References Cited

U.S. PATENT DOCUMENTS 9,054,747 B2 6/2015 Lee et al.
2014/0152249 A1 6/2014 Yeh
(Continued)

FOREIGN PATENT DOCUMENTS

JP 2017-184488 A 10/2017
KR 10-2016-0115383 A 10/2016
(Continued)

OTHER PUBLICATIONS

International Search Report dated Feb. 25, 2020 in connection with International Patent Application No. PCT/KR2019/015759, 3 pages.
(Continued)

*Primary Examiner* — Edward Tso
*Assistant Examiner* — Ahmed H Omar

(57) ABSTRACT

An electronic device includes a wireless charging coil, a wireless charging circuit, a power management module, a battery, and a processor. The processor is configured to control to receive first information from an external electronic device while transmitting wireless charging power to the external electronic device through the wireless charging circuit, to control, in response to receiving the first information, the wireless charging circuit to stop transmission of the wireless charging power and operate in a state of transmitting and receiving a ping signal, to check whether a predetermined time has elapsed since the transmission of the wireless charging power is stopped, and to control, in response to elapse of the predetermined time, the wireless charging circuit to retransmit the wireless charging power to the external electronic device. Other embodiments are possible.

20 Claims, 10 Drawing Sheets

(51) Int. Cl.
   *H02J 50/80*   (2016.01)
   *H02J 7/00*    (2006.01)
(58) Field of Classification Search
   USPC .......................................................... 320/108
   See application file for complete search history.

(56) References Cited

U.S. PATENT DOCUMENTS

| | | |
|---|---|---|
| 2015/0162785 A1 | 6/2015 | Lee et al. |
| 2015/0249339 A1 | 9/2015 | Van Wageningen et al. |
| 2016/0204642 A1* | 7/2016 | Oh .......................... H02J 7/025 |
| | | 320/108 |
| 2016/0285517 A1* | 9/2016 | Kazy .................... H04B 5/0037 |
| 2018/0062422 A1 | 3/2018 | Kim et al. |
| 2018/0123379 A1 | 5/2018 | Ha et al. |

FOREIGN PATENT DOCUMENTS

| | | |
|---|---|---|
| KR | 10-1789540 B2 | 11/2017 |
| KR | 10-2018-0024786 A | 3/2018 |

OTHER PUBLICATIONS

Supplementary European Search Report dated Dec. 16, 2021 in connection with European Patent Application No. 19 91 6428, 10 pages.

* cited by examiner

ELECTRONIC DEVICE AND METHOD FOR CONTROLLING WIRELESS CHARGING

CROSS-REFERENCE TO RELATED APPLICATION

This application is based on and claims priority under 35 U.S.C. 119 to Korean Patent Application No. 10-2019-0019288 filed on Feb. 19, 2019 in the Korean Intellectual Property Office, the disclosure of which is herein incorporated by reference in its entirety.

BACKGROUND

1. Field

The disclosure relates to an electronic device and method for controlling wireless charging when a call event occurs during the wireless charging.

2. Description of Related Art

With the growths of related technologies, a great variety of electronic devices such as a smart phone, a tablet personal computer (PC), a laptop PC, and a wearable device have been popularized.

In order to realize portability, such an electronic device may include a battery embedded therein. Also, the electronic device may include a charging terminal to be connected to an external power supply source by wire to charge the battery.

Recent electronic devices tend to support a wireless charging function for charging the battery wirelessly. Normally the wireless charging is implemented through a magnetic induction scheme or a magnetic resonance scheme without using a wired connection. For example, the wireless charging based on the magnetic induction scheme allows charging the battery wirelessly through a proximity contact that an electronic device operating as a wireless power reception device is merely placed on another electronic device operating as a wireless power transmission device.

When the wireless charging is performed, a capacitor trembling phenomenon may occur in each of the wireless power transmission device and the wireless power reception device. In addition, when a call event occurs in one of both electronic devices performing the wireless charging, the capacitor trembling phenomenon may degrade a call quality.

SUMMARY

According to various embodiments of the disclosure, an electronic device may include a wireless charging coil, a wireless charging circuit electrically connected to the wireless charging coil, a power management module electrically connected to the wireless charging circuit, a battery, and a processor operatively connected to the wireless charging circuit, the power management module, and the battery. The processor may be configured to receive first information from an external electronic device while transmitting wireless charging power to the external electronic device through the wireless charging circuit, to control, in response to receiving the first information, the wireless charging circuit to stop transmission of the wireless charging power and operate in a state of transmitting and receiving a ping signal, to check whether a predetermined time has elapsed since the transmission of the wireless charging power is stopped, and to control, in response to elapse of the predetermined time, the wireless charging circuit to retransmit the wireless charging power to the external electronic device.

According to various embodiments of the disclosure, an electronic device may include a wireless charging coil, a wireless charging circuit electrically connected to the wireless charging coil, a power management module electrically connected to the wireless charging circuit, a battery, a communication circuit, and a processor operatively connected to the wireless charging circuit, the power management module, the battery, and the communication circuit. The processor may be configured to check whether a call event occurs while receiving wireless charging power from an external electronic device and thereby charging the battery, to deactivate, in response to occurrence of the call event, the wireless charging circuit to stop charging the battery and operate in a standby state, to transmit, in response to the occurrence of the call event, first information to the external electronic device through the wireless charging circuit, to check whether the call event is terminated, and to activate, in response to termination of the call event, the wireless charging circuit to release the standby state and operate to be able to receive the wireless charging power.

According to various embodiments of the disclosure, an electronic device may include a wireless charging coil, a wireless charging circuit electrically connected to the wireless charging coil, a power management module electrically connected to the wireless charging circuit, a battery, a communication circuit, and a processor operatively connected to the wireless charging circuit, the power management module, the battery, and the communication circuit. The processor may be configured to check whether a call event occurs while transmitting wireless charging power to an external electronic device through the wireless charging circuit, to deactivate, in response to occurrence of the call event, the wireless charging circuit to stop transmission of the wireless charging power, to check whether the call event is terminated in a state where the wireless charging circuit is deactivated, and to activate, in response to termination of the call event, the wireless charging circuit to retransmit the wireless charging power to the external electronic device.

According to various embodiments of the disclosure, when a call event occurs during wireless charging, the electronic device controls the transmission and reception of wireless charging power until the call event is terminated, thereby minimizing noise caused by hardware problems such as a capacitor trembling and thus preventing a call quality from being degraded.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to accompanying drawings.

Figure 1:
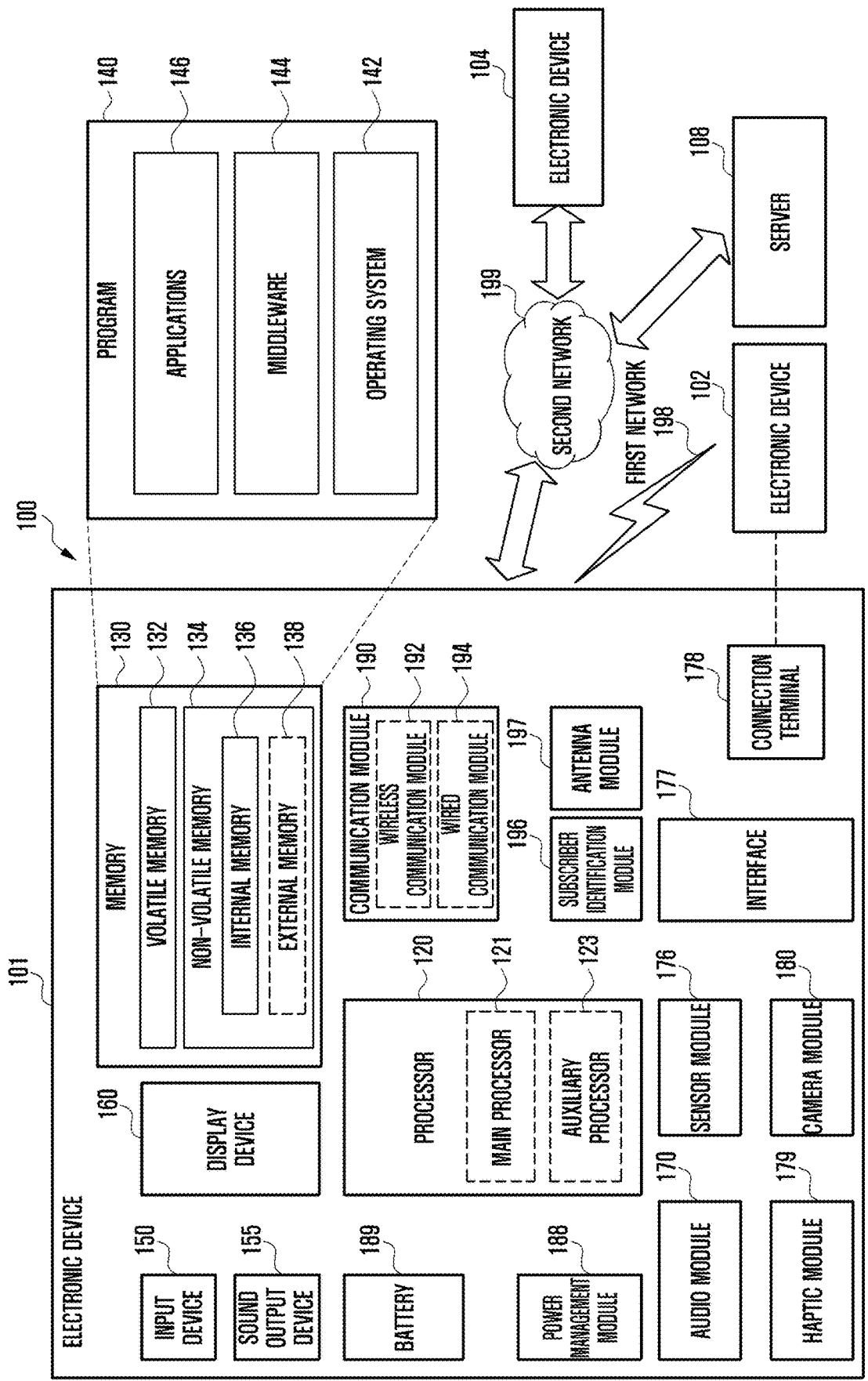
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a  nd output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In this embodiment, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
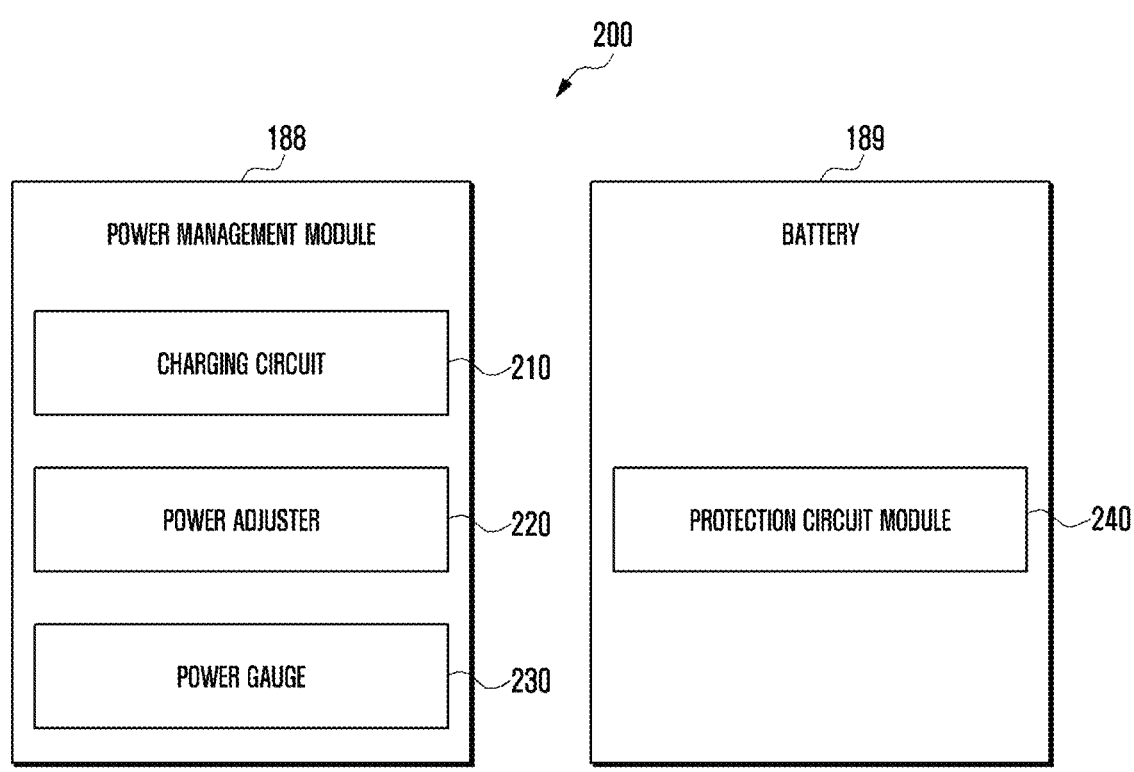
FIG. 2 is a block diagram illustrating a power management module and a battery according to various embodiments of the disclosure.

FIG. 2 is a block diagram 200 illustrating the power management module 188 and the battery 189 according to various embodiments. Referring to FIG. 2, the power management module 188 may include charging circuitry 210, a power adjuster 220, a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
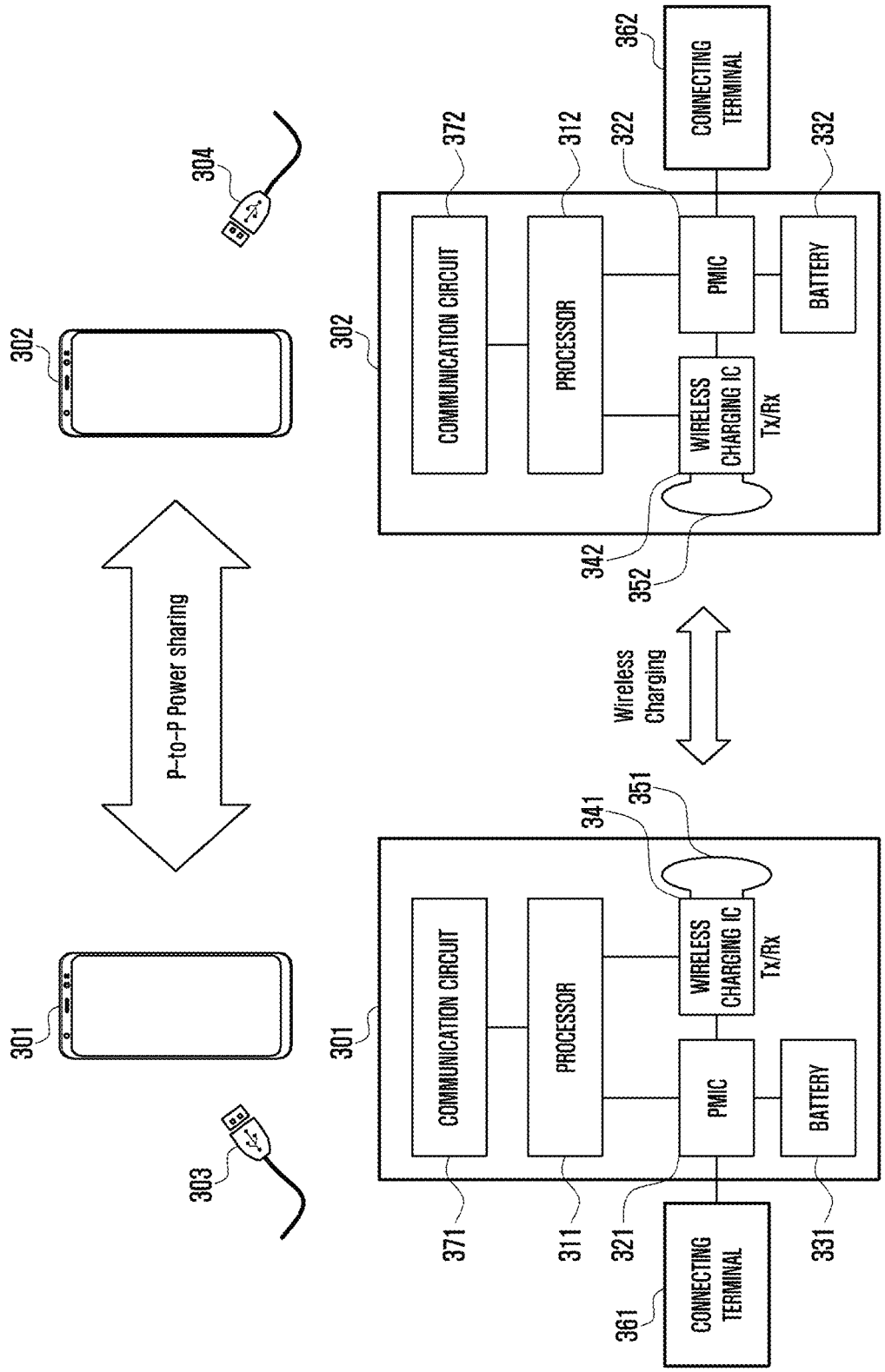
FIG. 3 is a conceptual diagram illustrating wireless power sharing between first and second electronic devices according to various embodiments of the disclosure.

FIG. 3 is a conceptual diagram illustrating wireless power sharing between first and second electronic devices according to various embodiments of the disclosure.

In FIG. 3, both a first electronic device 301 (e.g., the electronic device 101 in FIG. 1) and a second electronic device 302 (e.g., the electronic device 102 in FIG. 1) are expressed as devices capable of wireless power transmission/reception. However, in another embodiment, one of both may be an electronic device capable of only wireless power reception.

In this disclosure, the first electronic device 301 is described as a wireless power transmission device, and the second electronic device 302 is described as a wireless power reception device. According to various embodiments, the second electronic device 302 may have the same configuration as the first electronic device or have a configuration from which only a wireless power transmission function is removed.

According to various embodiments, the first electronic device 301 may include a processor 311 (e.g., the processor 120 in FIG. 1), a power management module 321 (e.g., the power management module 188 in FIG. 1, also referred to as a power management integrated chip (PMIC)), a battery 331 (e.g., the battery 189 in FIG. 1), a wireless charging circuit 341 (also referred to as a wireless charging IC), a wireless charging coil 351, a connecting terminal 361 (e.g., the connecting terminal 178 in FIG. 1), and/or a communication circuit 371 (e.g., the communication module 190 in FIG. 1). For example, when the first electronic device 301 operates as a wireless power transmission device (also referred to as a Tx mode terminal), the wireless charging circuit 341 may operate as a wireless power transmission circuit.

Similarly, the second electronic device 302 may include a processor 312 (e.g., the processor 120 in FIG. 1), a power management module 322 (e.g., the power management module 188 in FIG. 1), a battery 332 (e.g., the battery 189 in FIG. 1), a wireless charging circuit 342, a wireless charging coil 352, a connecting terminal 362 (e.g., the connecting terminal 178 in FIG. 1), and/or a communication circuit 372 (e.g., the communication module 190 in FIG. 1). For example, when the second electronic device 302 operates as a wireless power reception device (also referred to as an Rx mode terminal), the wireless charging circuit 342 may operate as a wireless power reception circuit.

According to various embodiments, each of the coils 351 and 352 may be formed of a spirally wound conductive pattern on a printed circuit board (PCB) or a flexible PCB (FPCB).

According to various embodiments, each of the wireless charging circuits 341 and 342 may include a full bridge circuit. For example, the wireless charging circuits 341 and 342 each may control the full bridge circuit to be operated as an inverter (for converting DC into AC) in a wireless power transmission mode, and control the full bridge circuit to be operated as a rectifier (for converting AC into DC) in a wireless power reception mode. For example, based on a wireless charging operation mode of the electronic device, each of the wireless charging circuits 341 and 342 may operate as a wireless power transmission circuit or a wireless power reception circuit.

In various embodiments, the wireless charging circuits 341 and 342 may exchange information used for wireless power transmission through in-band communication between the first and second electronic devices 301 and 302 in accordance with the wireless power consortium (WPC) standard. For example, the in-band communication may be a particular communication scheme capable of exchanging information between the first and second electronic devices 301 and 302 through modulation of frequency or amplitude of a wireless power transmission signal in a wireless power transmission situation between the coils 351 and 352. For example, such information may be IDs (e.g., model names or identification information) of the electronic devices 301 and 302 or charging operation mode information (e.g., information on transmitted/received power, voltage, or rectification, and information for changing the operation mode). Alternatively, the first and second electronic devices 301 and 302 may use out-band communication. For example, the out-band communication, which is different from a wireless power signal, may be short-range communication such as NFC, Bluetooth, or WiFi.

According to various embodiments, each of the power management modules 321 and 322 may have a charger function of charging the battery 331 with wired and wireless input power, a function of performing communication (e.g., USB battery charging specification, USB power delivery (PD) communication, automatic frequency control (AFC) communication, and/or quick charge (QC) communication) with an external power device (e.g., a travel adapter) connected to a USB terminal, a function of supplying power to the system and supplying suitable power of a required voltage level to each element, and/or a function of supplying power to the wireless charging circuits 341 and 342 in a wireless power transmission mode.

According to various embodiments, each of the connecting terminals 361 and 362 may be a terminal that conforms to the USB standard. For example, each of the connecting terminals 361 and 362 may be an interface for USB charging and/or On-The-Go (OTG) power supply. In various embodiments, the connecting terminals 361 and 362 each may be connected to an external power source (e.g., a travel adapter (TA), a battery pack). In various embodiments, the electronic device may detect whether any external power source is connected to the connecting terminal. In various embodiments, when an external power source 304 (e.g., a commercial power source) is connected to the connecting terminal 362 of the second electronic device 302, the second electronic device 302 may transmit power, received from the external power source 304, to the first electronic device 301. When the external power source 304 is not connected to the connecting terminal 362, the second electronic device 302 may transmit power, stored in the battery 332, to the first electronic device 301.

According to various embodiments, each of the communication circuits 371 and 372 may include a cellular communication module to be connected to a cellular network (e.g., 3G, LTE, 5G, Wibro, or Wimax). In various embodiments, each of the communication circuits 371 and 372 may include a short-range communication module to transmit/receive data to/from an external electronic device through short-range communication (e.g., Wi-Fi, Bluetooth, Bluetooth Low Energy (BLE), or UWB). In various embodiments, each of the electronic devices 301 and 302 may perform a call event (e.g., a voice call) using frequency communication through the communication circuits 371 and 372. In various embodiments, the electronic devices 301 and 302 may perform out-band communication through the communication circuits 371 and 372.

According to various embodiments, the electronic devices 301 and 302 may support at least one of various wireless power transmission schemes such as an electromagnetic induction scheme, an electromagnetic resonance scheme, and an RF wireless power transmission scheme.

According to various embodiments, the wireless power transmission scheme of the electronic devices 301 and 302 may use various wireless power transmission standards based on the electromagnetic induction scheme that a primary coil generates a magnetic field which induces a current in a secondary coil. The wireless power transmission standards of the electromagnetic induction scheme may include, for example, wireless charging techniques of the electromagnetic induction scheme defined in the Wireless Power Consortium (WPC) or the Power Matters Alliance (PMA).

According to various embodiments, the wireless power transmission scheme of the electronic devices 301 and 302 may use the electromagnetic resonance scheme that a wireless transfer of electric power is made between two coils tuned to resonate at the same resonance frequency. The electromagnetic resonance scheme may include wireless charging techniques of the resonance scheme defined in the Alliance for Wireless Power (AFWP).

According to various embodiments, the wireless charging between the first and second electronic devices 301 and 302 may maintain a close proximity of the first and second electronic devices 301 and 302 to each other. For example, the first and second electronic devices 301 and 302 may maintain close contact with each other for wireless charging.

According to various embodiments, the first electronic device 301 may operate in a wireless power transmission mode (Tx mode) using the battery 331. If any wired power supply source is connected, the first electronic device 301 may use external power for the wireless power transmission mode and use the remaining power for charging the battery 331. In various embodiments, when an external power source 303 (e.g., a commercial power source) is connected to the connecting terminal 361 of the first electronic device 301, the first electronic device 301 may transmit power, received from the external power source 303, to the second electronic device 302. When the external power source 303 is not connected to the connecting terminal 361, the first electronic device 301 may transmit power, stored in the battery 331, to the second electronic device 302.

In the disclosure, operating in the wireless power transmission mode (Tx mode) means that the electronic device (e.g., the first electronic device 301 in FIG. 3) is in a state of wirelessly transmitting power to an external electronic device (e.g., the second electronic device 302 in FIG. 2) by using the coil 351.

In addition, operating in the wireless power reception mode (Rx mode) means that the electronic device (e.g., the second electronic device 302 in FIG. 3) is in a state of wirelessly receiving power from an external electronic device (e.g., the first electronic device 301 in FIG. 3) through the coil 352 and charging the battery 332 by using the wirelessly received power.

According to various embodiments, when the wireless power transmission mode (Tx mode) is activated, the electronic device (e.g., the first electronic device 301 in FIG. 3) may perform the in-band communication with an external electronic device (e.g., the second electronic device 302 in FIG. 3) in accordance with a designated standard (e.g., the WPC standard) and thereby exchange information, used for wireless power transmission, with the external electronic device. For example, wireless charging related operations of the electronic device in accordance with the WPC standard may include a ping detection phase (or a ping phase), an identification and configuration phase for establishing a connection for wireless power transmission, and a power transfer phase.

According to various embodiments, the ping phase may be a particular step of transmitting a ping signal and detecting whether any wireless power reception device is close to the electronic device. For example, the wireless charging circuit of the electronic device may transmit a ping signal, and the wireless charging circuit of the external electronic device that receives the ping signal may transmit a response signal to the electronic device. Then, based on whether the response signal is received, the wireless charging circuit of the electronic device may detect the proximity of the external electronic device. According to various embodiments, the identification and configuration phase may be a particular step of setting a power transmission amount through communication between the wireless power transmission and reception devices. For example, in this step, the electronic device may determine designated wireless power to be transmitted to the external electronic device. According to various embodiments, the power transfer phase may be a particular step of transmitting the designated wireless power.

For example, in this step, the electronic device may transmit the designated wireless charging power to the external electronic device. According to various embodiments, when the wireless power transmission mode is activated, the electronic device transmits the wireless charging power by performing the above three phases. When the wireless power transmission mode is deactivated, the electronic device may not perform the above three phases.

According to various embodiments, when the electronic device 301 operating as the wireless power transmission device enters the ping phase, the electronic device 301 may transmit and receive only a ping signal without transmitting wireless charging power. When operating in the ping phase, the electronic device 301 may not transmit wireless charging power, but be in a state of being exchanging information used for wireless power transmission with the external electronic device 302 via the in-band communication. According to various embodiments, the electronic device 301 operating as the wireless power transmission device may enter the power transfer phase and transmit the wireless charging power to the external electronic device 302.

According to various embodiments, the electronic device 302 operating as the wireless power reception device may deactivate the wireless charging circuit 342 in order not to receive wireless charging power. For example, when the electronic device 302 deactivates the wireless charging circuit 342, the electronic device 302 may not receive wireless charging power transmitted from the electronic device 301 operating as the wireless power transmission device. For example, an operation of deactivating the wireless charging circuit 342 at the electronic device 302 may be an operation of stopping the reception of the wireless charging power to interrupt the charging of the battery 332 and waiting.

According to various embodiments, the first electronic device 301 may transmit wireless charging power to the second electronic device 302, and the second electronic device 302 may receive the wireless charging power and thereby charge the battery 332. During the wireless charging, a call event may occur in the first electronic device 301 or the second electronic device 302. In the wireless charging process, a trembling phenomenon may occur at a capacitor included in each of the wireless charging circuits 341 and 342 that manage power transmitted and received by the coils 351 and 352 of the first and second electronic devices 301 and 302. This trembling phenomenon of the capacitor may cause, for example, a noise that degrades a call quality.

Figure 4:
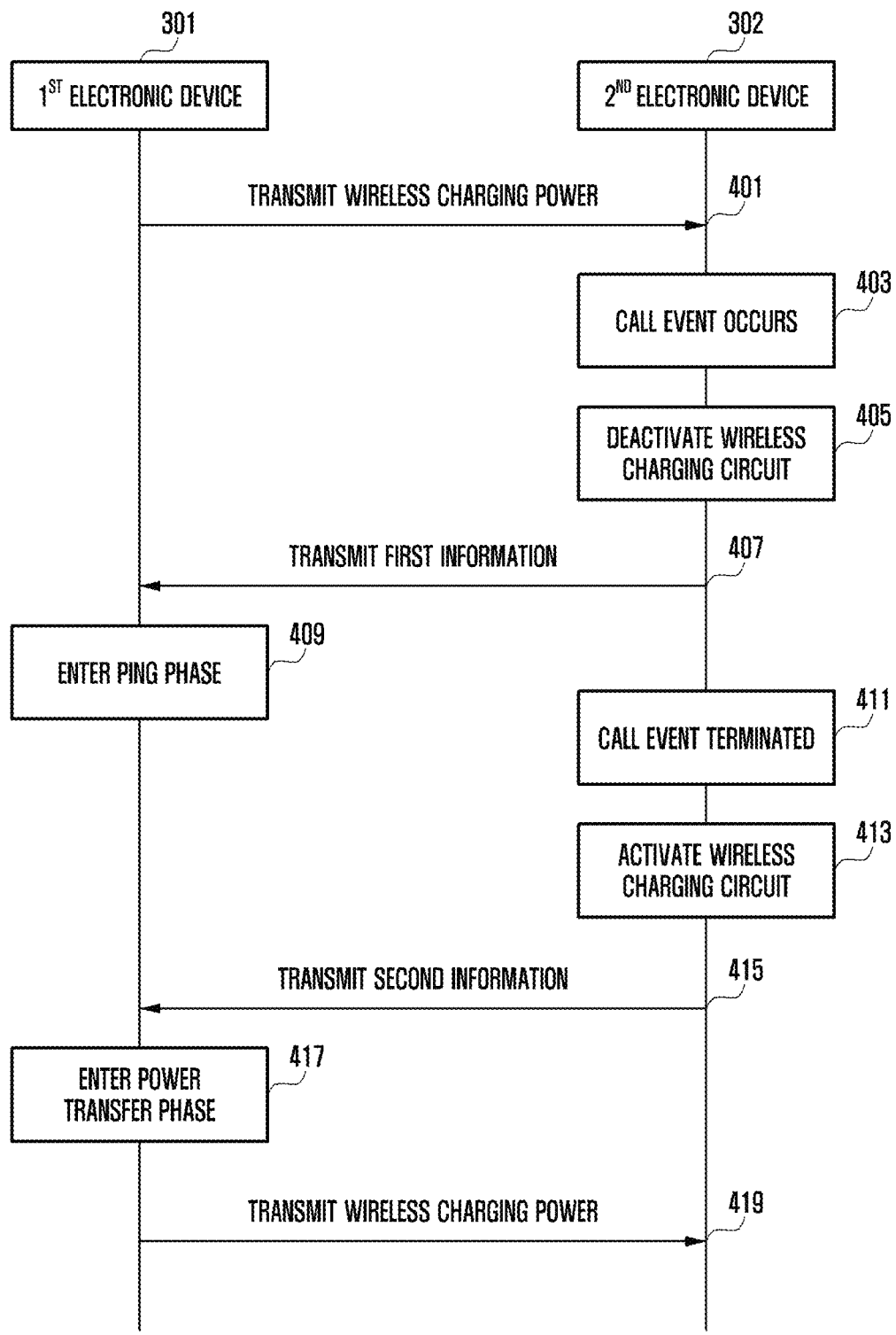
FIG. 4 is a flow diagram illustrating operations performed at and between first and second electronic devices according to various embodiments of the disclosure.

FIG. 4 is a flow diagram illustrating operations performed at and between first and second electronic devices according to various embodiments of the disclosure.

FIG. 4 shows a process in an embodiment where a call event occurs in the second electronic device 302 while the first electronic device 301 and the second electronic device 302 perform wireless charging.

Referring to FIG. 4, in various embodiments, the wireless charging may be performed between the first electronic device 301 operating as the wireless power transmission device (Tx mode) and the second electronic device 302 operating as the wireless power reception device (Rx mode). At operation 401, the first electronic device 301 may transmit wireless charging power to the second electronic device 302. Specifically, the wireless charging circuit 341 of the first electronic device 301 may transmit the wireless charging power to the second electronic device 302 under the control of the processor 311. Then, the wireless charging circuit 342 of the second electronic device 302 may receive the wireless charging power, and the processor 312 of the second electronic device 302 may control the power management module 322 to charge the battery 332 by using the received wireless charging power.

At operation 403, according to various embodiments, the processor 312 of the second electronic device 302 may check whether a call event occurs during the wireless charging. For example, the processor 312 of the second electronic device 302 may check whether there is occurrence of a call transmission/reception event based on frequency communication.

At operation 405, according to various embodiments, when the call event occurs in the second electronic device 302, the processor 312 of the second electronic device 302 may stop the charging of the battery 332 and deactivate the wireless charging circuit 342 in response to the occurrence of the call event. A state of deactivating the wireless charging circuit 342 may refer to, for example, a state of operating in a standby state rather than a wireless charging state of receiving the wireless charging power from the first electronic device 301 and charging the battery 332.

At operation 407, according to various embodiments, the processor 312 of the second electronic device 302 may transmit first information to the first electronic device 301 through the wireless charging circuit 342 in response to the occurrence of the call event. The first information may be, for example, packet-form information for switching an operation phase related to wireless charging of the first electronic device 301 from the power transfer phase to the ping phase. In various embodiments, the processor 312 of the second electronic device 302 may transmit the first information to the wireless charging circuit 341 of the first electronic device 301 via the in-band communication.

At operation 409, according to various embodiments, in response to receiving the first information from the second electronic device 302, the processor 311 of the first electronic device 301 may control the wireless charging circuit 341 to stop the transmission of the wireless charging power and enter the ping phase. The ping phase may refer to, for example, a state in which a wireless power transmission device (e.g., the first electronic device 301) operates to transmit and receive only a ping signal without transmitting wireless charging power. In various embodiments, when the first electronic device 301 enters the ping phase, the first electronic device 301 may transmit the ping signal periodically. In various embodiments, when the first electronic device 301 enters the ping phase, the processor 311 of the first electronic device 301 does not transmit the wireless charging power to the second electronic device 302, but may receive packet-form information related to wireless charging from the second electronic device 302.

At operation 411, according to various embodiments, the processor 312 of the second electronic device 302 may check whether the call event is terminated.

At operation 413, according to various embodiments, the processor 312 of the second electronic device 302 may activate the wireless charging circuit 342 in response to the termination of the call event. When activated, the wireless charging circuit 342 of the second electronic device 302 may operate to be able to wirelessly receive the wireless charging power from the first electronic device 301.

At operation 415, according to various embodiments, the processor 312 of the second electronic device 302 may transmit second information to the first electronic device 301 through the coil 352. The second information may be, for example, packet-form information for switching the wireless charging related operation phase of the first electronic device 301 from the ping phase to the power transfer phase.

In various embodiments, the processor 312 of the second electronic device 302 may transmit the second information to the wireless charging circuit 341 of the first electronic device 301 through the in-band communication.

At operation 417, according to various embodiments, in response to receiving the second information from the second electronic device 302, the processor 311 of the first electronic device 301 may enter the power transfer phase again and resume the transmission of the wireless charging power. For example, in response to receiving the second information, the processor 311 of the first electronic device 301 may control the wireless charging circuit 341 to release a state of transmitting/receiving the ping signal and to instead operate in a state of being capable of transmitting the wireless charging power to the second electronic device 302.

At operation 419, according to various embodiments, the processor 311 of the first electronic device 301 may transmit the wireless charging power to the second electronic device 302 through the wireless charging circuit 341.

Figure 5:
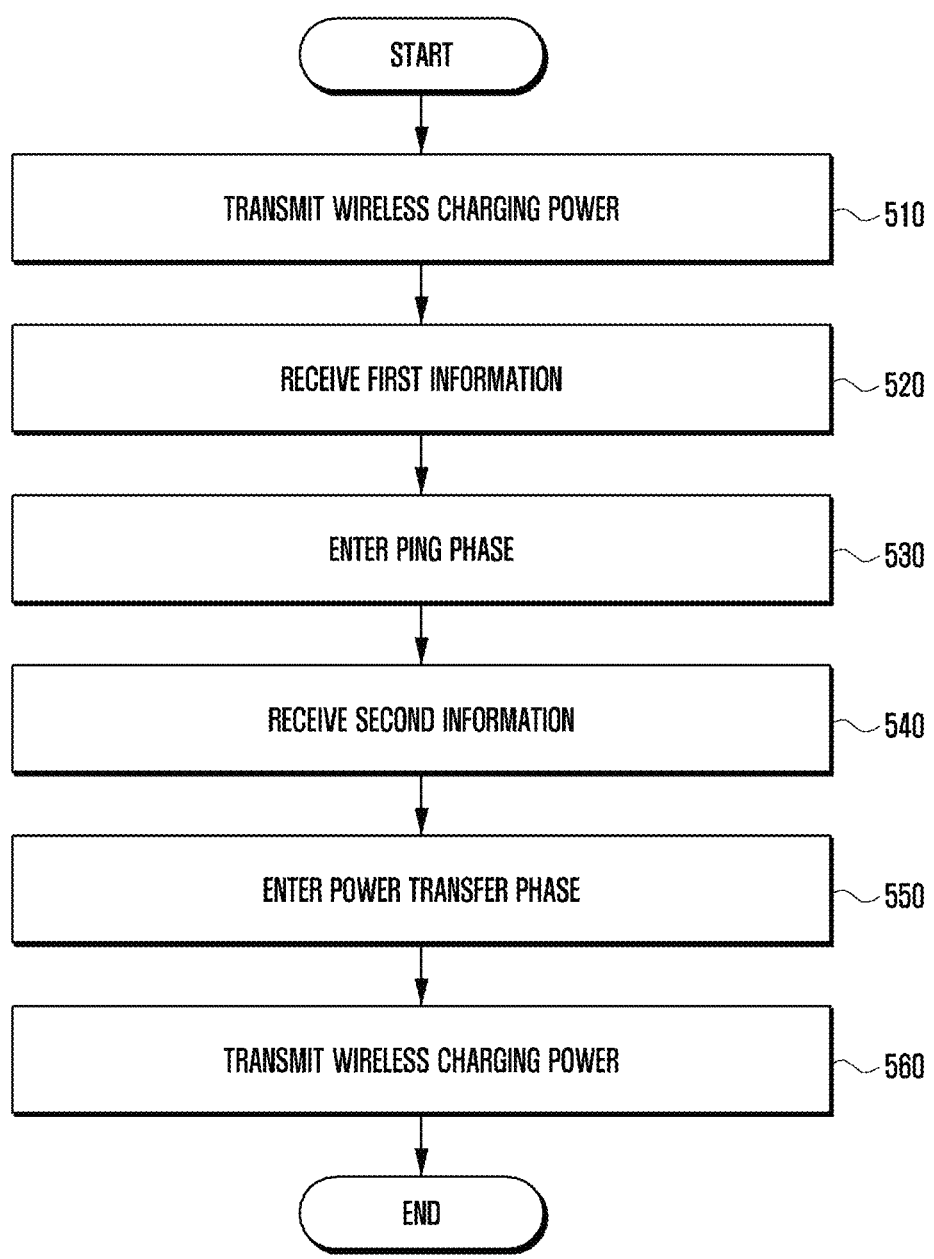
FIG. 5 is a flow diagram illustrating operations of a first electronic device according to various embodiments of the disclosure.
Figure 6:
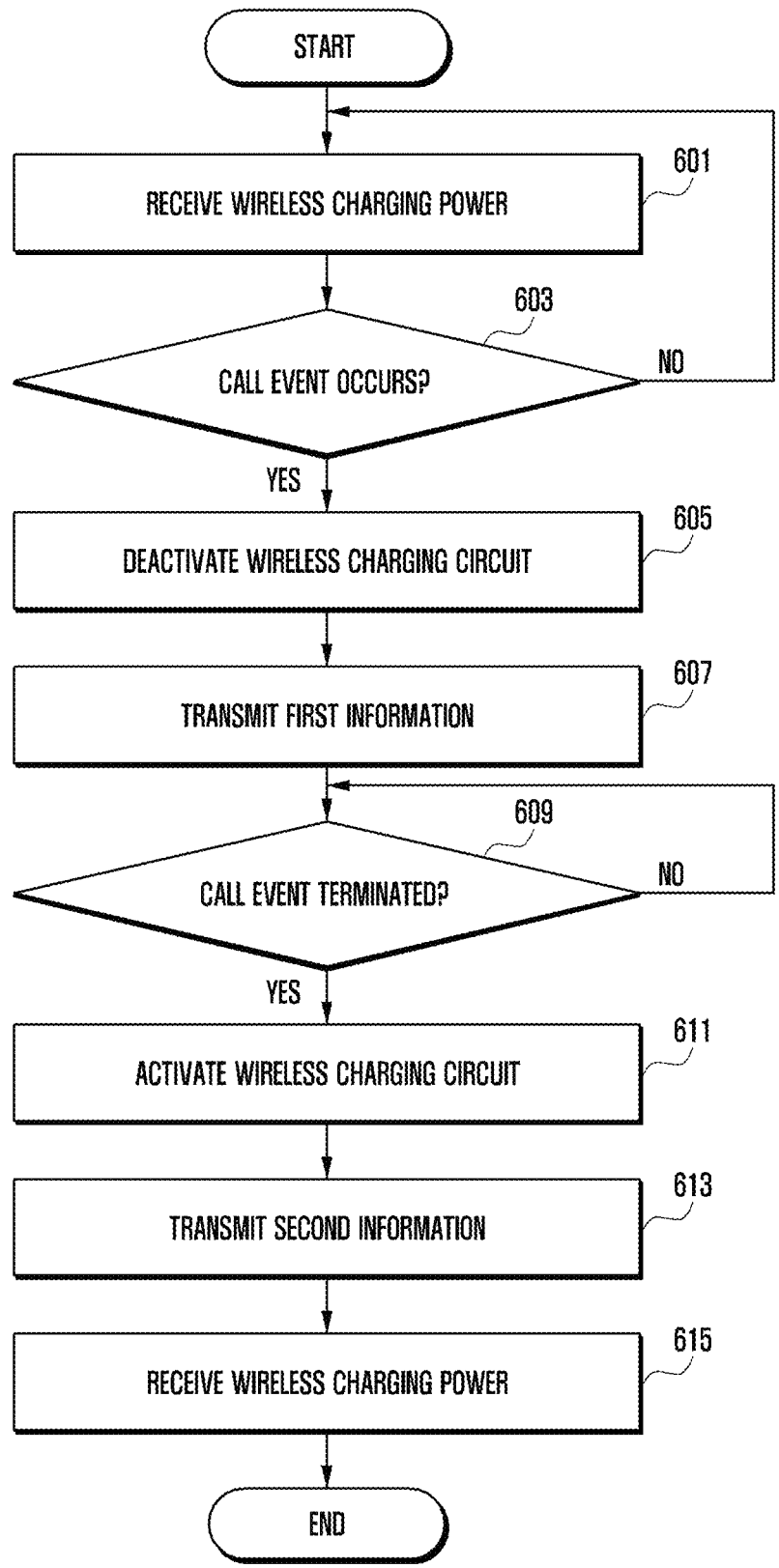
FIG. 6 is a flow diagram illustrating operations of a second electronic device according to various embodiments of the disclosure.

In connection with the operation flow shown in FIG. 4, FIGS. 5 and 6 show operations of the first and second electronic devices 301 and 302, respectively. That is, FIGS. 5 and 6 show processes in embodiments where the call event occurs in the second electronic device 302 while the first electronic device 301 and the second electronic device 302 perform wireless charging. In this embodiment, the first electronic device 301 operates as the wireless power transmission device (Tx mode), and the second electronic device 302 operates as the wireless power reception device (Rx mode).

FIG. 5 is a flow diagram illustrating operations of the first electronic device 301 according to various embodiments of the disclosure. Descriptions overlapping with those of FIG. 4 may be omitted hereinafter.

At operation 510, according to various embodiments, the first electronic device 301 may transmit the wireless charging power to the second electronic device 302. Specifically, the first electronic device 301 may enter the power transfer phase and transmit the wireless charging power to the second electronic device 302 through the wireless charging circuit 341.

At operation 520, according to various embodiments, the first electronic device 301 may receive first information. Specifically, the first electronic device 301 may receive the first information from the second electronic device 302 while transmitting the wireless charging power to the second electronic device 302. The first information may be, for example, packet-form information that causes the first electronic device 301 to switch from the power transfer phase to the ping phase.

At operation 530, according to various embodiments, in response to receiving the first information, the first electronic device 301 may enter the ping phase. Specifically, the first electronic device 301 may control the wireless charging circuit 341 to stop the transmission of the wireless charging power and enter the ping phase. For example, the first electronic device 301 may operate in a state of transmitting and receiving only a ping signal.

At operation 540, according to various embodiments, the first electronic device 301 may receive second information. Specifically, the first electronic device 301 may receive the second information from the second electronic device 302 while operating in the state of transmitting and receiving the ping signal. The second information may be, for example, packet-form information that causes the first electronic device 301 to switch from the ping phase to the power transfer phase.

At operation 550, according to various embodiments, in response to receiving the second information, the first electronic device 301 may enter the power transfer phase.

At operation 560, according to various embodiments, the first electronic device 301 may retransmit the wireless charging power to the second electronic device 302 through the wireless charging circuit 341.

FIG. 6 is a flow diagram illustrating operations of the second electronic device 302 according to various embodiments of the disclosure. Descriptions overlapping with those of FIG. 4 may be omitted hereinafter.

At operation 601, according to various embodiments, the second electronic device 302 may receive wireless charging power from the first electronic device 301. Specifically, the second electronic device 302 may receive the wireless charging power from the first electronic device 301 through the wireless charging circuit 342. Then, the processor 312 of the second electronic device 302 may control the power management module 322 to charge the battery 332 by using the received wireless charging power.

At operation 603, according to various embodiments, the processor 312 of the second electronic device 302 may check whether a call event occurs during the charging of the battery 332.

If no call event occurs, the second electronic device 302 may perform the operation 601 again to continuously receive the wireless charging power from the first electronic device 301 through the wireless charging circuit 342.

When the call event occurs, the second electronic device 302 may perform operation 605 to stop the charging of the battery 332 and deactivate the wireless charging circuit 342. A state of deactivating the wireless charging circuit 342 may refer to, for example, a state of operating in a standby state rather than a wireless charging state of receiving the wireless charging power from the first electronic device 301 and charging the battery 332.

At operation 607, according to various embodiments, the second electronic device 302 may transmit first information to the first electronic device 301. The first information may be, for example, packet-form information that causes the first electronic device 301 to switch from the power transfer phase to the ping phase.

At operation 609, according to various embodiments, the processor 312 of the second electronic device 302 may check whether the call event is terminated.

If the call event has been not terminated yet, the processor 312 of the second electronic device 302 may periodically perform the operation 609.

When the call event is terminated, the processor 312 of the second electronic device 302 may activate the wireless charging circuit 342 at operation 611. When activated, the wireless charging circuit 342 of the second electronic device 302 may operate to be able to receive the wireless charging power from the first electronic device 301.

At operation 613, according to various embodiments, the second electronic device 302 may transmit second information to the first electronic device 301. The second information may be, for example, packet-form information that causes the first electronic device 301 to enter the power transfer phase and transmit the wireless charging power.

At operation 615, according to various embodiments, the wireless charging circuit 342 of the second electronic device 302 may receive the wireless charging power from the first electronic device 301. Then, the processor 312 of the second electronic device 302 may resume the charging of the battery 332 by using the received wireless charging power.

Figure 7:
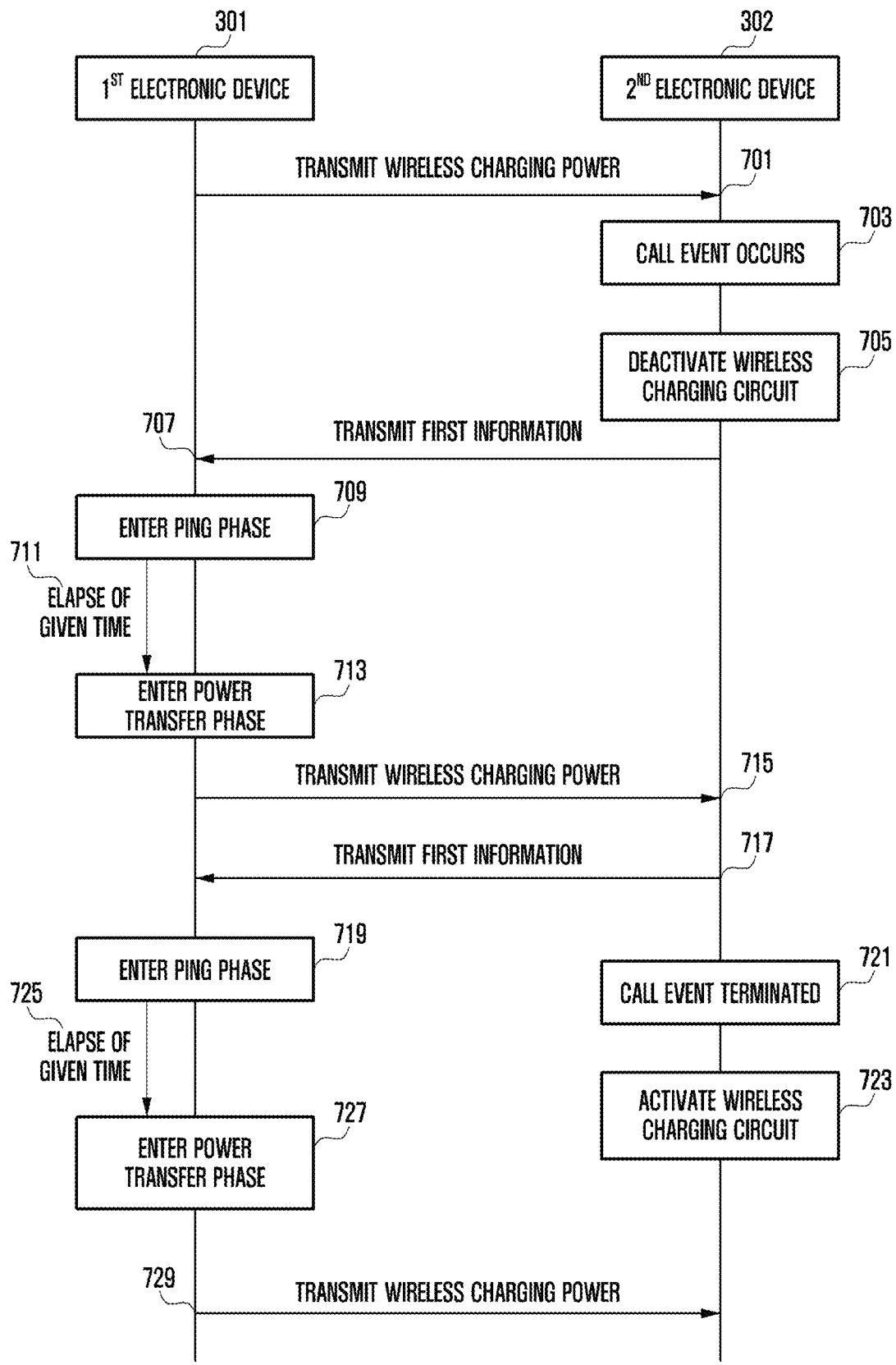
FIG. 7 is a flow diagram illustrating operations performed at and between first and second electronic devices according to various embodiments of the disclosure.

FIG. 7 is a flow diagram illustrating operations performed at and between first and second electronic devices according to various embodiments of the disclosure.

FIG. 7 shows a process in an embodiment where a call event occurs in the second electronic device 302 while the first electronic device 301 and the second electronic device 302 perform wireless charging. Descriptions overlapping with those of FIG. 4 may be omitted hereinafter.

Referring to FIG. 7, in various embodiments, the wireless charging may be performed between the first electronic device 301 operating as the wireless power transmission device and the second electronic device 302 operating as the wireless power reception device. At operation 701, the first electronic device 301 may transmit wireless charging power to the second electronic device 302.

At operation 703, according to various embodiments, the processor 312 of the second electronic device 302 may check whether a call event occurs during the wireless charging. For example, the processor 312 of the second electronic device 302 may check whether there is occurrence of a call transmission/reception event based on frequency communication.

At operation 705, according to various embodiments, when the call event occurs in the second electronic device 302, the processor 312 of the second electronic device 302 may deactivate, in response to the occurrence of the call event, the wireless charging circuit 342 to stop the charging of the battery 332 and operate in a standby state.

At operation 707, according to various embodiments, the processor 312 of the second electronic device 302 may transmit first information to the first electronic device 301 through the wireless charging circuit 342 in response to the occurrence of the call event. The first information may be, for example, packet-form information for switching an operation phase related to wireless charging of the first electronic device 301 from the power transfer phase to the ping phase. In various embodiments, the processor 312 of the second electronic device 302 may transmit the first information to the wireless charging circuit 341 of the first electronic device 301 via the in-band communication.

At operation 709, according to various embodiments, in response to receiving the first information from the second electronic device 302, the processor 311 of the first electronic device 301 may control the wireless charging circuit 341 to stop the transmission of the wireless charging power and enter the ping phase. The ping phase may refer to, for example, a state in which the first electronic device 301 operates to transmit and receive only a ping signal without transmitting wireless charging power. Thus, the processor 311 of the first electronic device 301 may control the wireless charging circuit 341 to operate in a state of stopping the transmission of the wireless charging power and transmitting/receiving the ping signal.

At operation 711, according to various embodiments, the processor 311 of the first electronic device 301 may check whether a predetermined time has elapsed since stopping the transmission of the wireless charging power and entering the ping phase. In various embodiments, the predetermined time may have a default value or a certain value set by a user.

At operation 713, according to various embodiments, the processor 311 of the first electronic device 301 may enter the power transfer phase again when the predetermined time has elapsed since stopping the transmission of the wireless charging power and entering the ping phase. For example, the processor 311 of the first electronic device 301 may control the wireless charging circuit 341 to switch from a state of transmitting/receiving the ping signal to a state of being able to transmit the wireless charging power.

At operation 715, according to various embodiments, the processor 311 of the first electronic device 301 may transmit the wireless charging power to the second electronic device 302 through the wireless charging circuit 341.

At operation 717, according to various embodiments, the processor 312 of the second electronic device 302 may check whether the call event is terminated. If the call event has been not terminated yet, the processor 312 of the second electronic device 302 may retransmit the first information to the first electronic device 301 through the wireless charging circuit 342.

At operation 719, according to various embodiments, in response to receiving again the first information from the second electronic device 302, the processor 311 of the first electronic device 301 may control the wireless charging circuit 341 to stop again the transmission of the wireless charging power and enter again the ping phase for the predetermined time.

At operation 721, according to various embodiments, the processor 312 of the second electronic device 302 may check whether the call event is terminated.

At operation 723, according to various embodiments, the processor 312 of the second electronic device 302 may activate the wireless charging circuit 342 in response to the termination of the call event. When activated, the wireless charging circuit 342 of the second electronic device 302 may operate to be able to wirelessly receive the wireless charging power from the first electronic device 301.

At operation 725, according to various embodiments, the processor 311 of the first electronic device 301 may check whether the predetermined time has elapsed since stopping the transmission of the wireless charging power and entering again the ping phase.

At operation 727, according to various embodiments, the processor 311 of the first electronic device 301 may enter again the power transfer phase when the predetermined time has elapsed since stopping the transmission of the wireless charging power and entering again the ping phase. For example, the processor 311 of the first electronic device 301 may control the wireless charging circuit 341 to switch from a state of transmitting/receiving the ping signal to a state of being able to transmit the wireless charging power.

At operation 729, according to various embodiments, the wireless charging circuit 341 of the first electronic device 301 may transmit the wireless charging power to the second electronic device 302 under the control of the processor 311. Then, the wireless charging circuit 342 of the second electronic device 302 may receive the wireless charging power, and the processor 312 of the second electronic device 302 may control the power management module 322 to resume the charging of the battery 332 by using the received wireless charging power.

Figure 8:
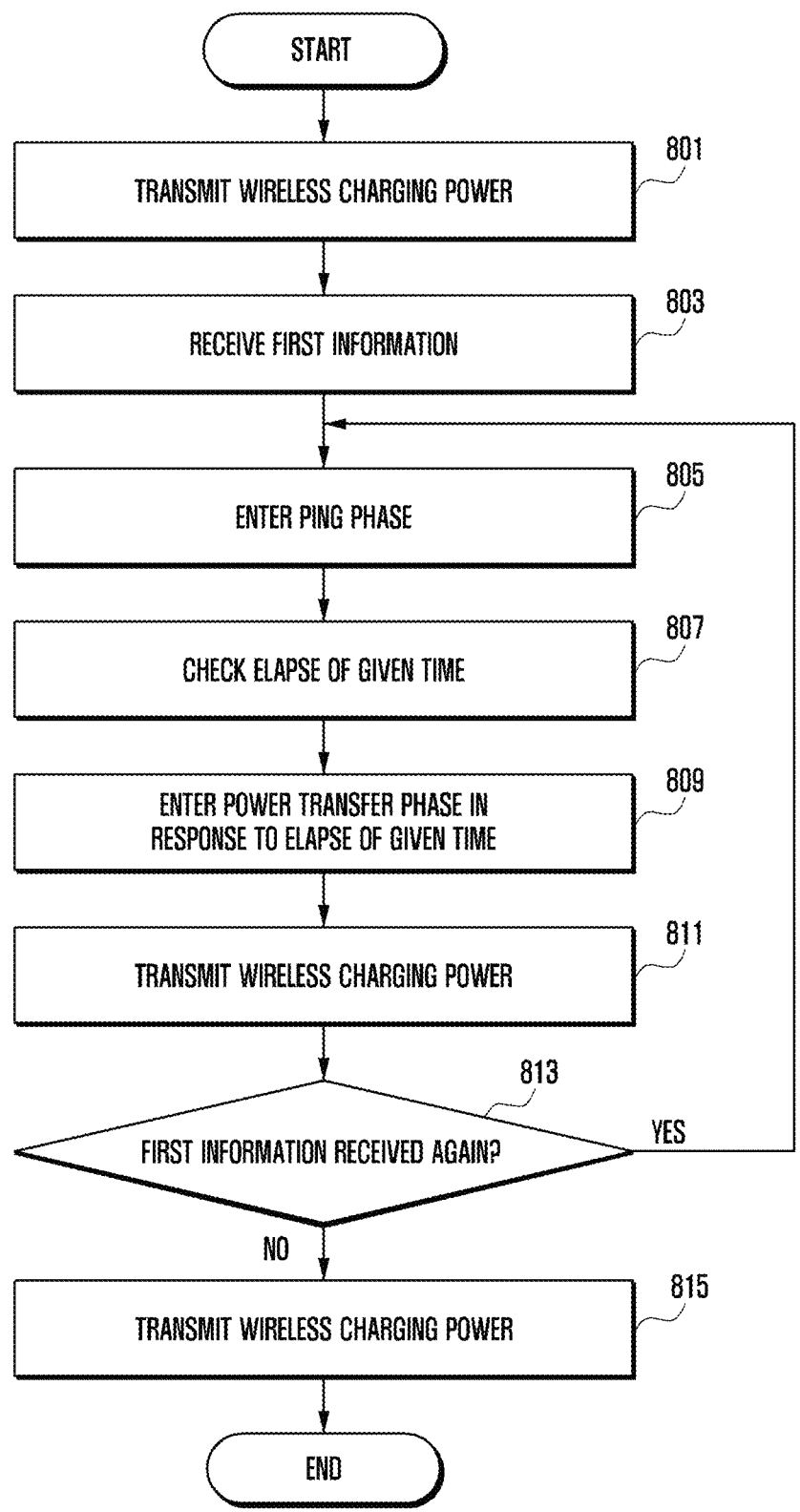
FIG. 8 is a flow diagram illustrating operations of a first electronic device according to various embodiments of the disclosure.
Figure 9:
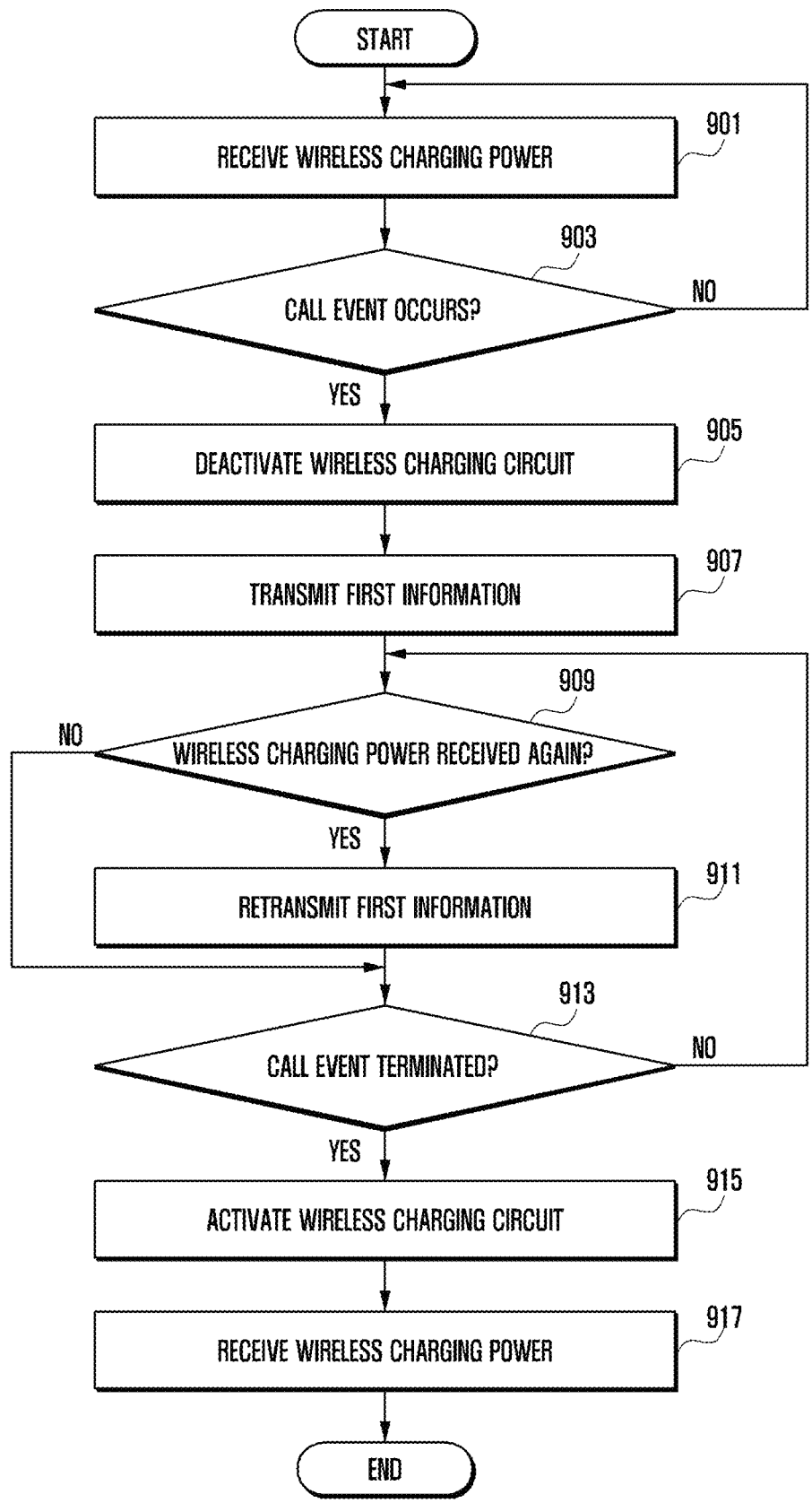
FIG. 9 is a flow diagram illustrating operations of a second electronic device according to various embodiments of the disclosure.

In connection with the operation flow shown in FIG. 7, FIGS. 8 and 9 show operations of the first and second electronic devices 301 and 302, respectively. That is, FIGS. 7 and 8 show processes in an embodiment where the call event occurs in the second electronic device 302 while the first electronic device 301 and the second electronic device 302 perform wireless charging. In this embodiment, the first electronic device 301 operates as the wireless power transmission device (Tx mode), and the second electronic device 302 operates as the wireless power reception device (Rx mode).

FIG. 8 is a flow diagram illustrating operations of the first electronic device 301 according to various embodiments of the disclosure. Descriptions overlapping with those of FIG. 7 may be omitted hereinafter.

At operation 801, according to various embodiments, the first electronic device 301 may transmit the wireless charging power to the second electronic device 302.

At operation 803, according to various embodiments, the first electronic device 301 may receive first information from the second electronic device 302.

At operation 805, according to various embodiments, in response to receiving the first information, the first electronic device 301 may control the wireless charging circuit 341 to stop the transmission of the wireless charging power and enter the ping phase.

At operation 807, according to various embodiments, the first electronic device 301 may check whether a predetermined time has elapsed since stopping the transmission of the wireless charging power and entering the ping phase.

At operation 809, according to various embodiments, the first electronic device 301 may enter again the power transfer phase from the ping phase when the predetermined time has elapsed since stopping the transmission of the wireless charging power and entering the ping phase.

At operation 811, according to various embodiments, the first electronic device 301 may retransmit the wireless charging power to the second electronic device 302 through the wireless charging circuit 341.

At operation 813, according to various embodiments, the first electronic device 301 may check whether the first information is received again from the second electronic device 302.

If the first information is received again, the first electronic device 301 may perform again the operation 805 for controlling the wireless charging circuit 341 to stop the transmission of the wireless charging power and enter again the ping phase.

If the first information is not received again, the first electronic device 301 may perform operation 815 for continuously transmitting the wireless charging power to the second electronic device 302.

Meanwhile, according to various embodiments, when the second electronic device 302 is out of a range capable of wireless charging from the first electronic device 301, or when the battery 332 of the second electronic device 302 is completely charged, the first electronic device 301 may not transmit the wireless charging power to the second electronic device 302.

FIG. 9 is a flow diagram illustrating operations of the second electronic device 302 according to various embodiments of the disclosure. Descriptions overlapping with those of FIG. 7 may be omitted hereinafter.

At operation 901, according to various embodiments, the second electronic device 302 may receive wireless charging power from the first electronic device 301 through the wireless charging circuit 342. Then, using the received wireless charging power, the second electronic device 302 may control the power management module 322 to charge the battery 332.

At operation 903, according to various embodiments, the second electronic device 302 may check whether a call event occurs during the charging of the battery 332.

If no call event occurs, the second electronic device 302 may perform the operation 901 again to continuously receive the wireless charging power and charge the battery 332.

When the call event occurs, the second electronic device 302 may perform operation 905 for deactivating the wireless charging circuit 342 to stop the charging of the battery 332 and operate in a standby state.

At operation 907, according to various embodiments, the second electronic device 302 may transmit first information to the first electronic device 301.

At operation 909, according to various embodiments, the second electronic device 302 may check whether the wireless charging power is received again from the first electronic device 301. Even if the wireless charging power is received again, the second electronic device 302 in which the wireless charging circuit is deactivated is incapable of performing the wireless charging.

When the wireless charging power is received again from the first electronic device 301, the second electronic device 302 may retransmit the first information to the first electronic device 301 at operation 911. According to various embodiments, after retransmission, the second electronic device 302 may check at operation 913 whether the call event is terminated.

When the wireless charging power is not received again from the first electronic device 301, the second electronic device 302 may perform the operation 913 to check whether the call event is terminated.

If the call event has been not terminated yet, the second electronic device 302 may perform again the operation 909 to check whether the wireless charging power is received again from the first electronic device 301.

When the call event is terminated, the second electronic device 302 may activate the wireless charging circuit 342 at operation 915. When activated, the wireless charging circuit 342 of the second electronic device 302 may operate to be able to receive the wireless charging power from the first electronic device 301.

At operation 917, according to various embodiments, the second electronic device 302 may receive the wireless charging power from the first electronic device 301 through the wireless charging circuit 342. Then, the processor 312 of the second electronic device 302 may resume the charging of the battery 332 by using the received wireless charging power.

Figure 10:
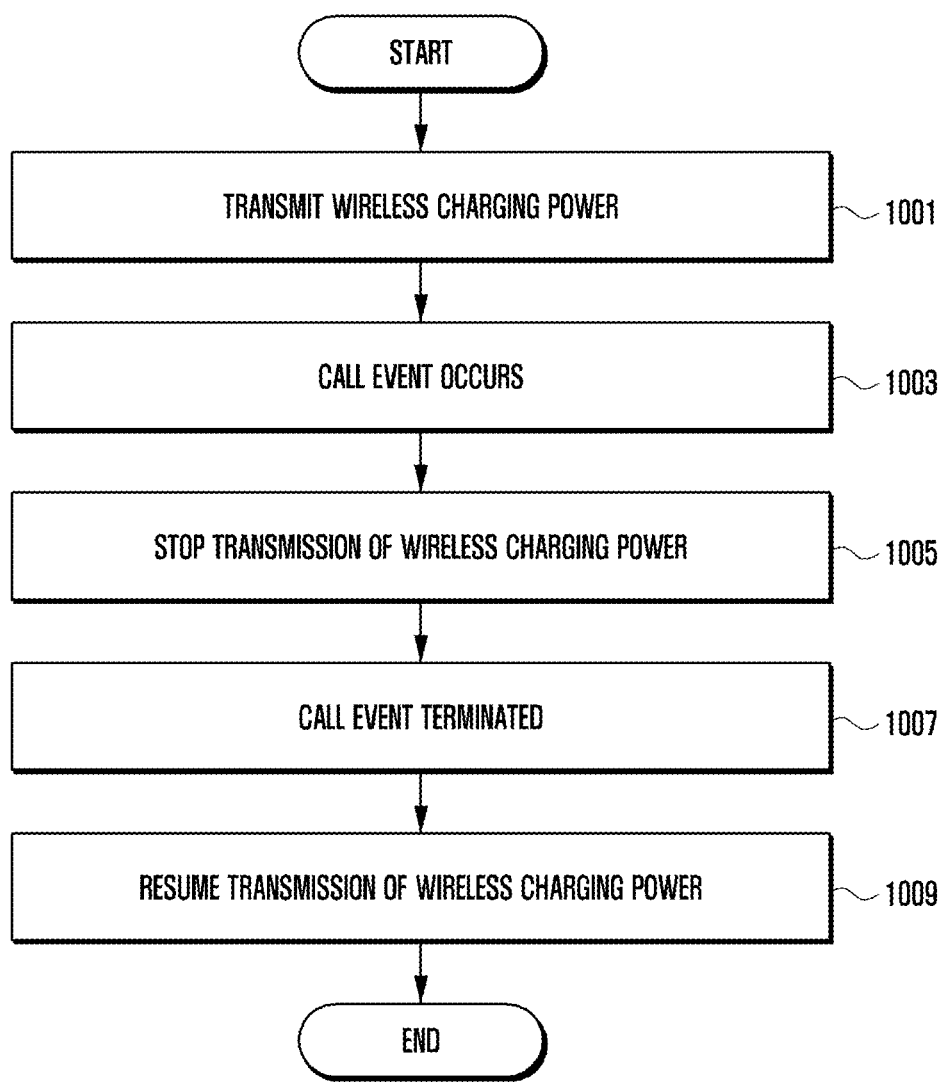
FIG. 10 is a flow diagram illustrating operations of a first electronic device according to various embodiments of the disclosure.

FIG. 10 is a flow diagram illustrating operations of a first electronic device according to various embodiments of the disclosure.

FIG. 10 shows the operations of the first electronic device 301 in an embodiment where a call event occurs in the first electronic device 301 operating as the wireless power transmission device while the first electronic device 301 and the second electronic device 302 perform wireless charging.

At operation 1001, according to various embodiments, the wireless charging circuit 341 of the first electronic device 301 may transmit the wireless charging power to the second electronic device 302 under the control of the processor 311.

At operation 1003, according to various embodiments, the processor 311 of the first electronic device 301 may check whether a call event occurs. For example, the processor 311 of the first electronic device 301 may check whether there is occurrence of a call transmission/reception event based on frequency communication.

At operation 1005, according to various embodiments, in response to the occurrence of the call event, the processor 311 of the first electronic device 301 may deactivate the wireless charging circuit 341 and thereby stop the transmission of the wireless charging power. For example, the processor 311 of the first electronic device 301 may turn off the wireless charging function and thereby stop the charging power transmission.

At operation 1007, according to various embodiments, the processor 311 of the first electronic device 301 may check whether the call event is terminated.

At operation 1009, according to various embodiments, in response to the termination of the call event, the processor 311 of the first electronic device 301 may activate again the wireless charging circuit 341. Then, the wireless charging circuit 341 of the first electronic device 301 may retransmit the wireless charging power to the second electronic device 302. For example, the processor 311 of the first electronic device 301 may turn on the wireless charging function and thereby resume the charging power transmission. According to various embodiments, the first electronic device 301 may identify the second electronic device 302 and transmit the wireless charging power to the identified second electronic device 302.

According to various embodiments of the disclosure, an electronic device 301 (e.g., the electronic device 101 in FIG. 1) may include a wireless charging coil 351, a wireless charging circuit 341 electrically connected to the wireless charging coil 351, a power management module 321 electrically connected to the wireless charging circuit 341, a battery 331, and a processor 311 operatively connected to the wireless charging circuit 341, the power management module 321, and the battery 331. The processor 311 may be configured to receive first information from an external electronic device (e.g., the second electronic device 302 in FIG. 3) while transmitting wireless charging power to the external electronic device through the wireless charging circuit 341, to control, in response to receiving the first information, the wireless charging circuit 341 to stop transmission of the wireless charging power and operate in a state of transmitting and receiving a ping signal, to check whether a predetermined time has elapsed since the transmission of the wireless charging power is stopped, and to control, in response to elapse of the predetermined time, the wireless charging circuit 341 to retransmit the wireless charging power to the external electronic device.

In the electronic device 301 according to various embodiments of the disclosure, the processor 311 may be further configured to control, in response to receiving again the first information from the external electronic device (e.g., the second electronic device 302 in FIG. 3) after retransmitting the wireless charging power to the external electronic device, the wireless charging circuit 341 to stop retransmission of the wireless charging power and operate again in the state of transmitting and receiving the ping signal, to check whether the predetermined time has elapsed since the retransmission of the wireless charging power is stopped, and to control, in response to elapse of the predetermined time, the wireless charging circuit 341 to transmit again the wireless charging power to the external electronic device.

In the electronic device 301 according to various embodiments of the disclosure, the first information may be packet-form information for switching an operation phase of the electronic device from a power transfer phase to a ping phase.

In the electronic device 301 according to various embodiments of the disclosure, the first information may be received from the external electronic device (e.g., the second electronic device 302 in FIG. 3) when a call event occurs in the external electronic device.

In the electronic device 301 according to various embodiments of the disclosure, the processor 311 may be further configured to receive second information from the external electronic device (e.g., the second electronic device 302 in FIG. 3) while operating in the state of transmitting and receiving the ping signal, and to control, in response to receiving the second information, the wireless charging circuit to release the state of transmitting and receiving the ping signal and retransmit the wireless charging power to the external electronic device.

In the electronic device 301 according to various embodiments of the disclosure, the second information may be packet-form information for switching an operation phase of the electronic device from a ping phase to a power transfer phase.

In the electronic device 301 according to various embodiments of the disclosure, the processor 311 may be further configured to receive the first information through the wireless charging circuit 341.

In the electronic device 301 according to various embodiments of the disclosure, the processor 311 may be further configured to detect, in response to the elapse of the predetermined time, proximity of the external electronic device (e.g., the second electronic device 302 in FIG. 3) by using the ping signal, and to retransmit the wireless charging power to the external electronic device when the proximity of the external electronic device is detected.

The electronic device 301 according to various embodiments of the disclosure may further include a connecting terminal 361, and the processor 311 may be further configured to control the power management module 321 to transmit power, received from an external power source (e.g., the external power source 303 in FIG. 3), to the external electronic device when the external power source is connected to the connecting terminal 361, and to transmit power, stored in the battery 331, to the external electronic device when the external power source is not connected to the connecting terminal 361.

According to various embodiments of the disclosure, an electronic device 302 may include a wireless charging coil 352, a wireless charging circuit 342 electrically connected to the wireless charging coil 352, a power management module 322 electrically connected to the wireless charging circuit 342, a battery 332, a communication circuit 372, and a processor 312 operatively connected to the wireless charging circuit 342, the power management module 322, the battery 332, and the communication circuit 372. The processor 311 may be configured to check whether a call event occurs while receiving wireless charging power from an external electronic device (e.g., the first electronic device 301 in FIG. 3) and thereby charging the battery 332, to deactivate, in response to occurrence of the call event, the wireless charging circuit 342 to stop charging the battery 332 and operate in a standby state, to transmit, in response to the occurrence of the call event, first information to the external electronic device through the wireless charging circuit 342, to check whether the call event is terminated, and to activate, in response to termination of the call event, the wireless charging circuit 342 to release the standby state and operate to be able to receive the wireless charging power.

In the electronic device 302 according to various embodiments of the disclosure, the processor 312 may be further configured to retransmit the first information to the external electronic device (e.g., the first electronic device 301 in FIG. 3) through the wireless charging circuit 342 when the wireless charging power is received from the external electronic device before the call event is terminated.

In the electronic device 302 according to various embodiments of the disclosure, the first information may be packet-form information for switching an operation phase of the external electronic device (e.g., the first electronic device 301 in FIG. 3) from a power transfer phase to a ping phase.

In the electronic device 302 according to various embodiments of the disclosure, the processor 312 may be further configured to transmit second information to the external electronic device (e.g., the first electronic device 301 in FIG. 3) through the wireless charging circuit 342 after activating the wireless charging circuit 342.

In the electronic device 302 according to various embodiments of the disclosure, the second information may be packet-form information for switching an operation phase of the external electronic device from a ping phase to a power transfer phase.

In the electronic device 302 according to various embodiments of the disclosure, the processor 312 may be further configured to transmit the first information through the wireless charging circuit 342.

In the electronic device 302 according to various embodiments of the disclosure, the processor 312 may be further configured to control, in response to no termination of the call event, the wireless charging circuit 342 to maintain a deactivated state.

According to various embodiments of the disclosure, an electronic device 301 may include a wireless charging coil 351, a wireless charging circuit 341 electrically connected to the wireless charging coil 351, a power management module 321 electrically connected to the wireless charging circuit 341, a battery 331, a communication circuit 371, and a processor 311 operatively connected to the wireless charging circuit 341, the power management module 321, the battery 331, and the communication circuit 371. The processor 311 may be configured to check whether a call event occurs while transmitting wireless charging power to an external electronic device (e.g., the second electronic device 302 in FIG. 3) through the wireless charging circuit 341, to deactivate, in response to occurrence of the call event, the wireless charging circuit 341 to stop transmission of the wireless charging power, to check whether the call event is terminated in a state where the wireless charging circuit 341 is deactivated, and to activate, in response to termination of the call event, the wireless charging circuit 341 to retransmit the wireless charging power to the external electronic device.

In the electronic device 301 according to various embodiments of the disclosure, the processor 311 may be further configured to detect proximity of the external electronic device (e.g., the second electronic device 302 in FIG. 3) by transmitting a ping signal after activating the wireless charging circuit 341, and to retransmit the wireless charging power to the external electronic device when the proximity of the external electronic device is detected.

In the electronic device 301 according to various embodiments of the disclosure, the processor 311 may be further configured to control, in response to no termination of the call event, the wireless charging circuit 341 to maintain a deactivated state.

The electronic device 301 according to various embodiments of the disclosure may further include a connecting terminal 361, and the processor 311 may be further configured to control the power management module 321 to transmit power, received from an external power source (e.g., the external power source 303 in FIG. 3), to the external electronic device (e.g., the second electronic device 302 in FIG. 3) when the external power source is connected to the connecting terminal 361, and to transmit power, stored in the battery 331, to the external electronic device when the external power source is not connected to the connecting terminal 361.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In these various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a wireless charging coil;
   a wireless charging circuit electrically connected to the wireless charging coil;
   a power management module electrically connected to the wireless charging circuit;
   a battery; and
   a processor operatively connected to the wireless charging circuit, the power management module, and the battery and configured to:
      control to receive first information from an external electronic device while transmitting wireless charging power to the external electronic device through the wireless charging circuit,
      control, in response to receiving the first information, the wireless charging circuit to stop transmission of the wireless charging power and operate in a state of transmitting and receiving a ping signal,
      check whether a predetermined time has elapsed since the transmission of the wireless charging power is stopped, and
      control, in response to elapse of the predetermined time, the wireless charging circuit to retransmit the wireless charging power to the external electronic device.

2. The electronic device of claim 1, wherein the processor is further configured to:
control, in response to receiving again the first information from the external electronic device after retransmitting the wireless charging power to the external electronic device, the wireless charging circuit to stop retransmission of the wireless charging power and operate again in the state of transmitting and receiving the ping signal,
check whether the predetermined time has elapsed since the retransmission of the wireless charging power is stopped, and
control, in response to elapse of the predetermined time, the wireless charging circuit to transmit again the wireless charging power to the external electronic device.

3. The electronic device of claim 1, wherein the first information is packet-form information for switching an operation phase of the electronic device from a power transfer phase to a ping phase.

4. The electronic device of claim 3, wherein the first information is received from the external electronic device when a call event occurs in the external electronic device.

5. The electronic device of claim 1, wherein the processor is further configured to:
receive second information from the external electronic device while operating in the state of transmitting and receiving the ping signal, and
control, in response to receiving the second information, the wireless charging circuit to release the state of transmitting and receiving the ping signal and retransmit the wireless charging power to the external electronic device.

6. The electronic device of claim 5, wherein the second information is packet-form information for switching an operation phase of the electronic device from a ping phase to a power transfer phase.

7. The electronic device of claim 1, wherein the processor is further configured to receive the first information through the wireless charging circuit.

8. The electronic device of claim 1, wherein the processor is further configured to:
detect, in response to the elapse of the predetermined time, proximity of the external electronic device by using the ping signal, and
control to retransmit the wireless charging power to the external electronic device when the proximity of the external electronic device is detected.

9. The electronic device of claim 1, further comprising a connecting terminal,
wherein the processor is further configured to control the power management module to:
control to transmit power, received from an external power source, to the external electronic device when the external power source is connected to the connecting terminal, and
control to transmit power, stored in the battery, to the external electronic device when the external power source is not connected to the connecting terminal.

10. An electronic device comprising:
a wireless charging coil;
a wireless charging circuit electrically connected to the wireless charging coil;
a power management module electrically connected to the wireless charging circuit;
a battery;
a communication circuit; and
a processor operatively connected to the wireless charging circuit, the power management module, the battery, and the communication circuit and configured to:
check whether a call event occurs while receiving wireless charging power from an external electronic device and the battery is being charged,
deactivate, in response to occurrence of the call event, the wireless charging circuit to stop charging the battery and operate in a standby state,
control to transmit, in response to the occurrence of the call event, first information to the external electronic device through the wireless charging circuit, the first information causing the external electronic device to operate in a state of transmitting and receiving a ping signal without transmitting the wireless charging power,
check whether the call event is terminated, and
activate, in response to termination of the call event, the wireless charging circuit to release the standby state and operate to be able to receive the wireless charging power.

11. The electronic device of claim 10, wherein the processor is further configured to:
control to retransmit the first information to the external electronic device through the wireless charging circuit when the wireless charging power is received from the external electronic device before the call event is terminated.

12. The electronic device of claim 10, wherein the first information is packet-form information for switching an operation phase of the external electronic device from a power transfer phase to a ping phase.

13. The electronic device of claim 10, wherein the processor is further configured to:
control to transmit second information to the external electronic device through the wireless charging circuit after activating the wireless charging circuit.

14. The electronic device of claim 13, wherein the second information is packet-form information for switching an operation phase of the external electronic device from a ping phase to a power transfer phase.

15. The electronic device of claim 10, wherein the processor is further configured to control to transmit the first information through the wireless charging circuit.

16. The electronic device of claim 10, wherein the processor is further configured to:
control, in response to no termination of the call event, the wireless charging circuit to maintain a deactivated state.

17. An electronic device comprising:
a wireless charging coil;
a wireless charging circuit electrically connected to the wireless charging coil;
a power management module electrically connected to the wireless charging circuit;
a battery;
a communication circuit; and
a processor operatively connected to the wireless charging circuit, the power management module, the battery, and the communication circuit and configured to:
check whether a call event occurs while transmitting wireless charging power to an external electronic device through the wireless charging circuit, based on first information received from the external electronic device through the wireless charging circuit, deactivate, in response to occurrence of the call event, the wireless charging circuit to stop transmission of the wireless charging power, check whether the call event is terminated in a state where the wireless charging circuit is deactivated, and activate, in response to termination of the call event, the wireless charging circuit to retransmit the wireless charging power to the external electronic device, wherein the first information causes the external electronic device to operate in a state of transmitting and receiving a ping signal without transmitting the wireless charging power.

18. The electronic device of claim 17, wherein the processor is further configured to:

detect proximity of the external electronic device by transmitting a ping signal after activating the wireless charging circuit, and control to retransmit the wireless charging power to the external electronic device when the proximity of the external electronic device is detected.

19. The electronic device of claim 17, wherein the processor is further configured to:

control, in response to no termination of the call event, the wireless charging circuit to maintain a deactivated state.

20. The electronic device of claim 17, further comprising a connecting terminal, wherein the processor is further configured to control the power management module to:

control to transmit power, received from an external power source, to the external electronic device when the external power source is connected to the connecting terminal, and control to transmit power, stored in the battery, to the external electronic device when the external power source is not connected to the connecting terminal.

* * * * *